US012580487B2

(12) United States Patent (10) Patent No.: US 12,580,487 B2
Sigamani et al. (45) Date of Patent: Mar. 17, 2026

(54) INTEGRATED CURRENT BALANCING IN COUPLED TRANSFORMERS

(71) Applicant: Astec International Limited, Kowloon (HK)

(72) Inventors: James Sigamani, Pasig (PH); Jonathan Ross B. Fauni, Quezon (PH); Rochie Sedillo Libby, Pasig (PH)

(73) Assignee: AES Global Holdings PTE Ltd., Singapore (SG)

( * ) Notice: Subject to any disclaimer, the term of this patent is extended or adjusted under 35 U.S.C. 154(b) by 921 days.

(21) Appl. No.: 17/664,758

(22) Filed: May 24, 2022

(65) Prior Publication Data

US 2023/0387810 A1 Nov. 30, 2023

(51) Int. Cl.
    | | |
    |---|---|
    | *H01F 27/24* | (2006.01) |
    | *H01F 27/30* | (2006.01) |
    | *H02M 1/00* | (2006.01) |
    | *H02M 3/335* | (2006.01) |

(52) U.S. Cl.
    CPC ........ *H02M 3/33569* (2013.01); *H01F 27/24* (2013.01); *H01F 27/306* (2013.01); *H02M 1/0048* (2021.05)

(58) Field of Classification Search
    CPC .. H02M 3/33569; H02M 1/0048; H02M 3/01; H02M 1/0064; H02M 3/33573; H01F 27/24; H01F 27/306; H01F 3/14; H01F 27/38; H01F 27/34; H01F 38/26; H01F 37/24
    See application file for complete search history.

(56) References Cited

U.S. PATENT DOCUMENTS

| | | | | |
|---|---|---|---|---|
| 3,188,552 A | * | 6/1965 | Owen | H01F 29/14 |
| | | | | 323/334 |
| 3,753,189 A | * | 8/1973 | Allen | H03H 7/0123 |
| | | | | 336/182 |
| 4,902,942 A | * | 2/1990 | El-Hamamsy | H01F 29/14 |
| | | | | 315/276 |

(Continued)

FOREIGN PATENT DOCUMENTS

WO        2017118432 A1        7/2017

OTHER PUBLICATIONS

M. Noah et al., "A Current Sharing Method Utilizing Single Balancing Transformer for a Multiphase LLC Resonant Converter With Integrated Magnetics," IEEE, vol. 6, No. 2, pp. 977-992, Jun. 2018. (Abstract only).

*Primary Examiner* — Mang Tin Bik Lian

(57) ABSTRACT

A voltage transformer comprises a multi-limb transformer core having a central limb, a first outer limb, and a second outer limb. The voltage transformer also comprises a first primary winding wound about the central limb, a second primary winding wound about the central limb, a first secondary winding wound about the central limb, and a second secondary winding wound about the central limb. A first balance winding is wound about the first outer limb and coupled in series with the first primary winding, and a second balance winding is wound about the second outer limb and coupled in series with the second primary winding. The first and second balance windings are coupleable together via mutual inductance in response to first and second currents flowing therethrough.

20 Claims, 7 Drawing Sheets

(56) References Cited

U.S. PATENT DOCUMENTS

| | | | | |
|---|---|---|---|---|
| 6,310,444 | B1 * | 10/2001 | Chang | H05B 41/2827 |
| | | | | 323/361 |
| 9,236,808 | B1 * | 1/2016 | Hung | H02M 3/285 |
| 11,018,589 | B1 * | 5/2021 | Huang | H02M 7/08 |
| 2008/0129218 | A1 * | 6/2008 | Shinmen | H05B 41/2855 |
| | | | | 315/280 |
| 2010/0301982 | A1 * | 12/2010 | Bordin | H05B 45/397 |
| | | | | 336/170 |
| 2011/0101865 | A1 * | 5/2011 | Cheng | H05B 41/2822 |
| | | | | 315/121 |
| 2023/0147551 | A1 * | 5/2023 | Chen | H02M 7/487 |
| | | | | 307/10.1 |
| 2023/0215614 | A1 * | 7/2023 | Chen | H01F 3/14 |
| | | | | 336/12 |
| 2023/0261581 | A1 * | 8/2023 | Sigamani | H02M 3/33573 |
| | | | | 307/82 |

* cited by examiner

INTEGRATED CURRENT BALANCING IN COUPLED TRANSFORMERS

TECHNICAL FIELD

Aspects of the disclosure relate to output power distribution, and more particularly to multi-rail power conversion.

BACKGROUND

A power supply unit is an electrical device that supplies electric power to an electrical load. Indeed, power supply units typically have a power input connection, which receives energy in the form of electric current from a source, and one or more power output connections that deliver current to the load. The primary function of a power supply is to convert electric current from a source to a correct voltage, current, and frequency to power a load. Indeed, a power supply unit may perform a variety of functions, such as, but not limited to, power conversion, alternating current to direct current (AC-DC) or DC-DC conversion, adjusting voltage levels, and providing backup power during power grid outages. A power supply system typically includes multiple power sources (or power supply units) that provide power and power management functionality including load current sharing among the multiple power sources.

An increased demand for high-density packaging of power conversion has led to applications such as DC-DC modules and low-profile board-mount bricks whereby a given main transformer can have multiple primary windings coupled to multi-rail converters that are fed from different input sources. However, current imbalance circulating among the primary currents due to differences in input voltage and/or component value tolerances can negatively impact the converter efficiency and can even cause the converter to fail.

FIGS. 1 and 2 illustrate an example multi-rail power converter and simulated graphs showing current imbalance in the primary currents. In FIG. 1, a power supply 100 has a pair of power converters 101, 102 having voltage inputs connected to different voltage source 103, 104. The power converters 101, 102 are coupled with respective primary windings of a transformer 105. Secondary windings of the transformer 105 transfer energy through a rectifier 106 for output voltage delivery to a load 107 via a voltage output 108. FIG. 2 shows a phase shift in the primary currents 200, 201 supplied by the power converters 101, 102 in response to a diversion of the input voltages 202, 203 provided by the voltage sources 103, 104. In addition to the imbalance in the input voltages, differences in component values such as resonant component values in the case of resonant converters further contribute to the imbalance in the primary currents, resulting in additional circulating current negatively affecting the converter efficiency.

One way to combat the current imbalance when the transformer primary windings are connected to two different input sources and are coupled together on the same core is to introduce sufficient leakage inductance in the main transformer 105 to reduce or eliminate the circulating current. However, higher leakage inductance generally reduces the performance of the transformer and increases its size. In resonant conversion applications, the additional leakage inductance becomes part of the resonant tank and, hence, cannot prevent the circulating current.

SUMMARY

In accordance with one aspect of the present disclosure, a voltage transformer comprises a multi-limb transformer core having a central limb, a first outer limb, and a second outer limb. The voltage transformer also comprises a first primary winding wound about the central limb, a second primary winding wound about the central limb, a first secondary winding wound about the central limb, and a second secondary winding wound about the central limb. A first balance winding is wound about the first outer limb and coupled in series with the first primary winding, and a second balance winding is wound about the second outer limb and coupled in series with the second primary winding. The first and second balance windings are coupleable together via mutual inductance in response to first and second currents flowing therethrough.

In accordance with another aspect of the present disclosure, a power supply comprises a transformer having a core comprising a central limb and a pair of outer limbs, a pair of primary windings wound about the central limb, a pair of secondary windings wound about the central limb, a first balance winding wound about a first outer limb of the pair of outer limbs and coupled in series with a first primary winding of the pair of primary windings via a first current flow path, and a second balance winding wound about a second outer limb of the pair of outer limbs and coupled in series with a second primary winding of the pair of primary windings via a second current flow path. The power supply also comprises first and second voltage converters, each having a voltage input configured to receive a distinct input voltage and having a plurality of switches coupled between the voltage input and the transformer. At least one switch of the plurality of switches of the first voltage converter is coupled with the first primary winding via the first current flow path, and at least one switch of the plurality of switches of the second voltage converter is coupled with the second primary winding via a second current flow path. The first balance winding is inductively coupled with the second balance winding via mutual inductance in response to first and second currents flowing through the first and second current flow paths.

BRIEF DESCRIPTION OF THE DRAWINGS

The drawings illustrate embodiments presently contemplated for carrying out the invention.

In the drawings.

US 12,580,487 B2

3

Figure 1:
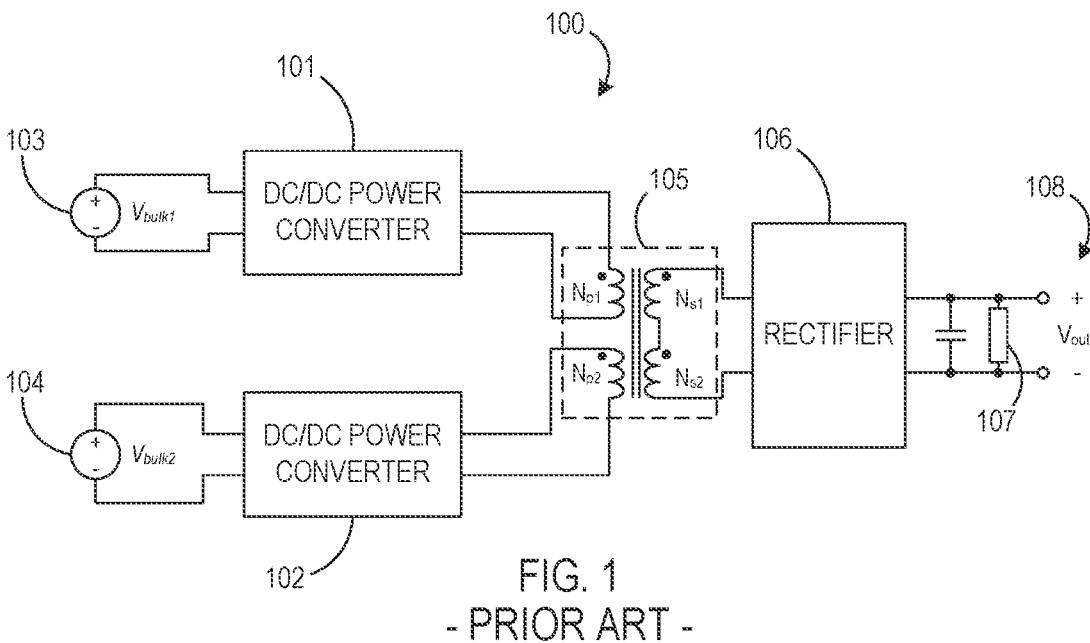
FIG. 1 is a schematic diagram of a known multi-rail power converter subject to current imbalance in an example.
Figure 2:
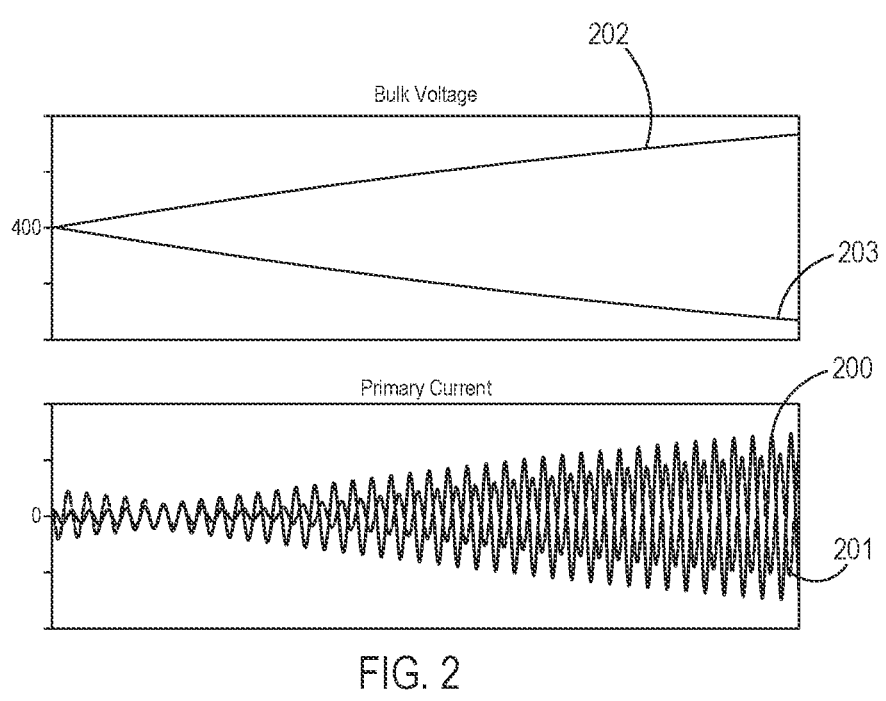
FIG. 2 illustrates simulated voltage and current curves illustrating effects of current imbalance due to divergent input voltages to the power converters of FIG. 1 in an example.
Figure 3:
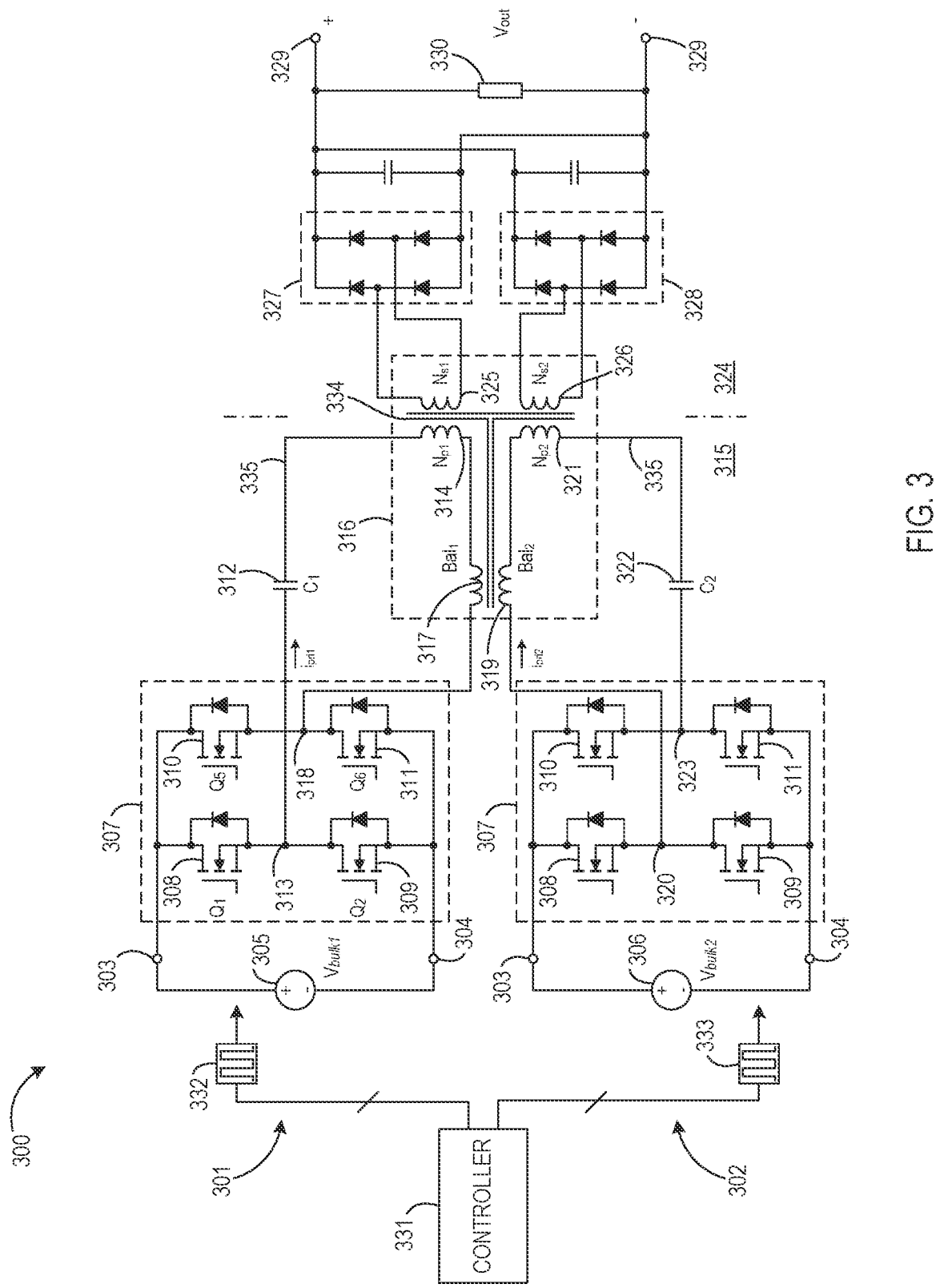
FIG. 3 illustrates a schematic diagram of a multi-rail power converter according to an embodiment.
Figure 10:
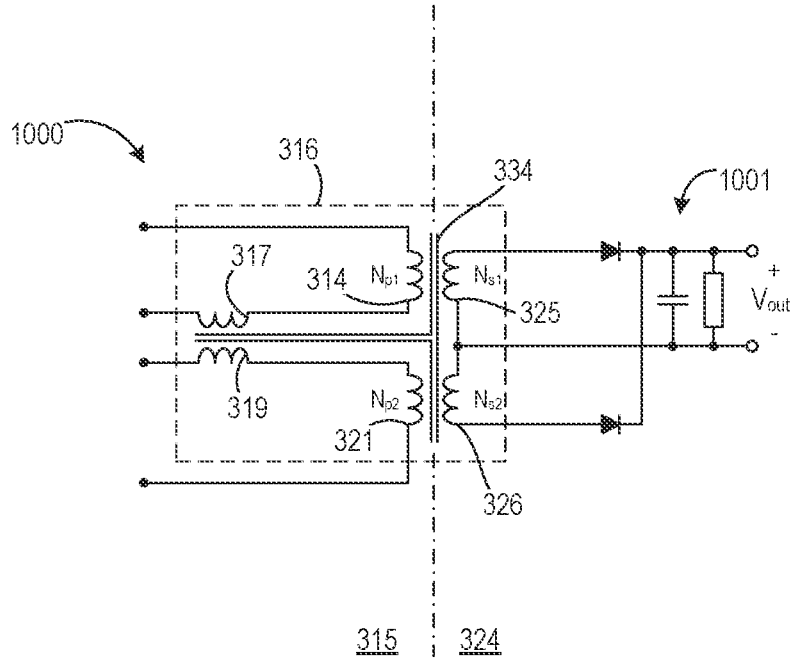

FIG. 10 illustrates a schematic diagram of a portion of the multi-rail power converter of FIG. 3 according to another embodiment.

Figure 11:
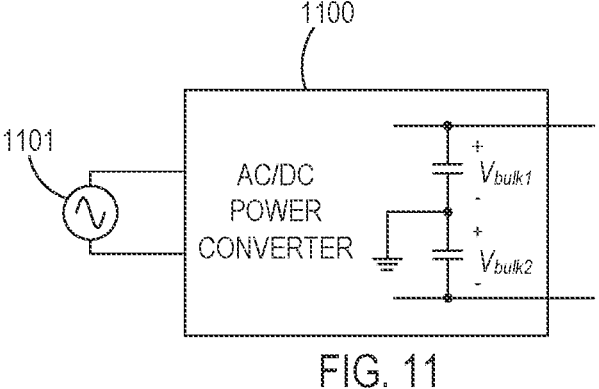

FIG. 11 illustrates a power supply according to an embodiment.

Figure 12:
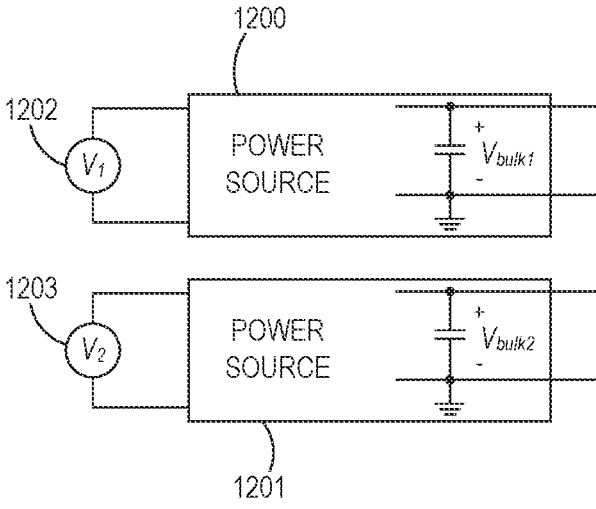

FIG. 12 illustrates multiple power supplies according to an embodiment.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

FIG. 3 illustrates a schematic diagram of a multi-rail power converter 300 according to an embodiment. A pair of voltage converters 301, 302 are shown. Implementations of this disclosure, however, are not limited to two converters. Each voltage converter 301, 302 is shown implemented as a resonant full-bridge LLC series converter and has a voltage input formed from a pair of voltage input terminals 303, 304 that is coupleable with a voltage source 305, 306 providing respective input voltages $V_{bulk1}$, $V_{bulk2}$. As further described herein, embodiments of this disclosure are not limited to resonant full-bridge LLC series converters. That is, means for reducing current imbalance among the multiple power converters may benefit resonant converters, forward converters, buck-based converters, and the like. The LLC voltage converters 301, 302 include a switching bridge 307 having a first pair of power switches 308, 309 coupled in series and in parallel with the respective voltage inputs and a second pair of power switches 310, 311 coupled in series and in parallel with the respective voltage inputs. Referring to the voltage converter 301, a resonant capacitor 312 is coupled in series between a common node 313 of the power switches 308, 309 and a first terminal of a first primary winding (Np1) 314 on a primary side 315 of a transformer 316. A second terminal of the first primary winding 314 is further coupled in series with a first terminal of a first balance winding (Bal1) 317, which has a second terminal further serially coupled with a common node 318 of the power switches 310, 311. Referring to the voltage converter 302, a first terminal of a second balance winding (Bal2) 319 of the transformer 316 is serially coupled with a common node 320 of the power switches 308, 309 and a second terminal of the second balance winding 319 is coupled with a first terminal of a second primary winding (Np2) 321 of the transformer 316. A resonant capacitor 322 is serially coupled between a second terminal of the second primary winding 321 and a common node 323 of the power switches 310, 311.

On a secondary side 324 of the transformer 316, a pair of secondary windings 325, 326 is coupled to respective full-bridge rectifying circuits 327, 328 to convert an AC-induced current on the secondary windings 325, 326 into a DC current for delivering an output voltage on a voltage output 329 to a load 330. The rectifying circuits 327, 328 are shown as a full-wave rectifiers including four diodes. In other configurations, the diodes may be replaced with synchronous rectifier switches.

A controller 331 is coupled to control the power switches 308-311 of the voltage converters 301, 302 using pulse-width modulation (PWM) signals 332, 333 in one implementation. The illustrated PWM signals 332, 333 are representative of the PWM signals sent to all switches 308-311 and may include a distinct PWM control signal for each power switch 308-311. The controller 331 (or another controller) may be also configured to drive any power switches in the rectifying circuits 327, 328 if used through an isolation component such as an optocoupler, a transformer, or other isolation device. The controller 331 is configured to control the power switches 308-311 in a synchronous manner such that power conversion in the voltage converter 301 is in phase with the power conversion in the voltage converter 302. For example, the PWM signals 332, 333 may control the on and off states of the power switches 308, 311 together in one phase the on and off states of the power switches 309, 310 in another phase.

The voltage converters 301, 302 may be coupled in a stacked arrangement or in a parallel arrangement. The use of a single main transformer 316 with both voltage converters 301, 302 allows space savings when a high-power, high-density power supply is desired. Since both converters 301, 302 supply current to the main transformer 316, winding the primary windings 314, 321 about a core 334 in a tightly-coupled arrangement can reduce leakage inductance between the windings 314, 321 as this leakage inductance contributes to conversion inefficiency such as when there is higher winding proximity loss. The voltage sources 305, 306 provide independent voltages to the respective voltage converters 301, 302. Accordingly, they may provide different voltages and currents to the voltage converters 301, 302, causing different primary currents $i_{pri1}$, $i_{pri2}$ to flow through the current flow paths 335. Alternatively or in addition thereto, tolerances and construction of the components of the voltage converters 301, 302 may further contribute to different primary currents. In a tightly-coupled arrangement as described above, a current imbalance in the primary currents $i_{pri1}$, $i_{pri2}$ results in current recirculation where current from one voltage converter transfers to the other. For example, if one of the voltage converters (e.g., voltage converter 301) produces a higher primary current than the other (e.g., voltage converter 302), a portion of the primary current $i_{pri1}$ of voltage converter 301 is transferred to the voltage converter 302 rather than to the secondary winding 325 as intended. Accordingly, converter efficiency is reduced.

To address and reduce or eliminate current imbalance among the primary currents $i_{pri1}$ and $i_{pri2}$ flowing through current flow paths 335, the first and second balance windings 317, 319 are serially coupled in the respective current flow paths 335 while they are simultaneously inductively coupled together in an anti-parallel arrangement. That is, the balance windings 317, 319 are wound around the same core 334, but the directions of the primary currents $i_{pri1}$ and $i_{pri2}$ flowing through them are such that their resulting flux in core 334 are opposite each other. With the six windings 314, 317, 319, 321, 325, 326 wrapped about the same core 334, symbols for the winding relationships indicated by dot convention and illustrated in the figures of this disclosure are customized to uniquely identify the relationships between various windings pairs. The winding relationships and their respective symbols are presented in TABLE 1 below.

TABLE 1

| Winding Relationship | Symbol |
| --- | --- |
| primary winding 314/secondary winding 325 | Solid-filled circle |
| primary winding 321/secondary winding 326 | Solid-filled square |
| balance winding 317/balance winding 319 | Solid-filled triangle |
| primary winding 314/balance winding 317 | Outlined circle |
| primary winding 321/balance winding 319 | Outlined square |

Figure 4:
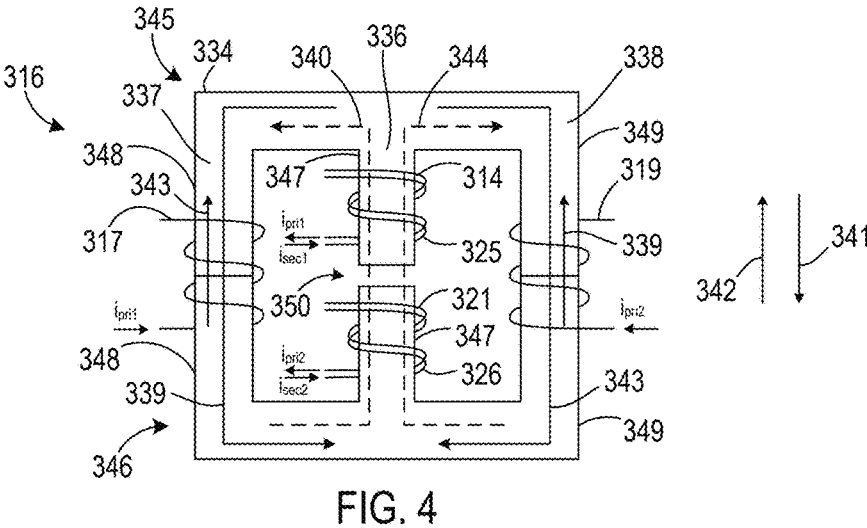
FIG. 4 illustrates a winding arrangement of the main transformer according to an embodiment.
Figure 5:
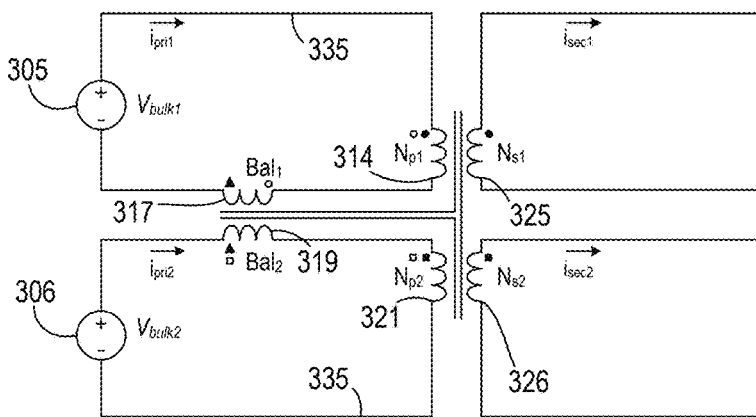
FIG. 5 illustrates a simplified current flow diagram of the multi-rail power converter of FIG. 3 based on the winding arrangement of FIG. 4 according to a embodiment.

Referring to FIGS. 4 and 5, a winding protocol of the transformer windings about the core 334 is illustrated in FIG. 4, and FIG. 5 illustrates a simplified current flow diagram of the multi-rail power converter 300 of FIG. 3 according to examples. The core 334 is a multi-limb core having at least three limbs: a central limb 336, a first outer limb 337, and a second outer limb 338.

As illustrated in FIGS. 4 and 5, the winding relationship (illustrated as an outlined circle) of the primary winding 314 and balance winding 317 corresponds with the primary current $i_{pri1}$ flowing into the respective first terminals of primary winding 314 and balance winding 317 in the flux-aiding relationship. In this relationship, the magnetic flux 339 generated by the first balance winding 317 and the magnetic flux 340 generated by the first primary winding 314 flow in the same direction 341 (e.g., in a downward direction as shown in FIG. 4) through the first outer limb 337. Through the central limb 336, however, the magnetic flux 340 flows in an opposite direction 342 than that of the magnetic flux 339 flowing through the first outer limb 337. However, the portion of the magnetic flux 339 flowing through the central limb 336 flows in the same direction 342 as that of the magnetic flux 340. Similarly, the winding relationship (illustrated as an outlined square) of the primary winding 321 and balance winding 319 corresponds with the primary current $i_{pri2}$ flowing into the respective first terminals of the second primary winding 321 and the second balance winding 319 in the flux-aiding relationship. Accordingly, the magnetic flux 343 generated by the second balance winding 319 and the magnetic flux 344 generated by the second primary winding 321 flow in the same downward direction 341 through the second outer limb 338 and in the same upward direction 342 through the central limb 336. The respective flux-aiding relationships of the fluxes 339, 340 and the fluxes 343, 344 persist throughout the core 334. While the relationships of the fluxes 339, 340 and the fluxes 343, 344 are flux-aiding as described above, the relationship of the fluxes 339, 343 generated by the balance windings 317, 319 is a flux-opposing relationship along the outer limbs 337, 338.

As illustrated in FIG. 4, the core 334 may be implemented as an EE-shaped core having an upper E portion 345 and a lower E portion 346. Each portion 345, 346 has a central limb portion 347 and first and second outer limb portions 348, 349. However, other core geometries having three or more limbs are also contemplated herein. An air gap 350 between the respective central limbs of the upper and lower E portions presents an impedance significantly higher than the core material that concentrates the balance coil fluxes 339, 343 in the outer limbs 337, 338. In addition, the impedance helps to reduce the balance coil fluxes 339, 343 from becoming additive (e.g., flux-aiding) with the fluxes 340, 344 of the primary windings 314, 321 through the central limb 336. The magnetic flux 339 is generated in response to the primary current $i_{pri1}$ produced in the voltage converter 301 based on the voltage supplied by the voltage source 305. The primary current $i_{pri2}$ produced in the voltage converter 302 is based on the voltage supplied by the voltage source 306. While the generated magnetic fluxes 339, 343 flow in the same direction 341 within their respective limbs 337, 338, the magnetic flux 339 flows in a counterclockwise manner about the outer limbs 337, 338 while the magnetic flux 343 flows in a clockwise manner when considered from the same point of view such as illustrated in FIG. 4. Due, at least in part, to the mutual inductance formed between the first and second balance windings 317, 319, the opposing magnetic fluxes 339, 343 reduce current imbalance between the current flow paths 335. The first and second balance windings 317, 319 may be wound about the core 334 in a loosely-coupled arrangement to create a leakage inductance capable of providing the resonant inductance for each of the voltage converters 301, 302. Accordingly, the balancing windings 317, 319 can be designed with sufficient leakage inductance to obtain the desired Lr for resonant converter applications requiring such. For applications not requiring such functionality, the balancing windings 317, 319 may be designed to minimize the leakage component.

The output voltage of the flux-aiding arrangement illustrated in FIGS. 4 and 5 may be calculated based on the following equation:

$$V_{out} = V_{in} \times \left[ \frac{N_{sec}}{\left( N_{pri} + \left( \frac{N_{bal}}{2} \right) \right)} \right], \quad \text{(Eqn. 1)}$$

where $V_{out}$ is the output voltage, $V_{in}$ is the input voltage, $N_{pri}$ is the number of turns of the primary winding, $N_{sec}$ is the number of turns of the secondary winding, $N_{bal}$ is the number of turns of the balance winding, either $Bal_1$ or $Bal_2$. It can be shown that the magnetic flux generated by one of the balance windings is half that of the magnetic flux generated by the center limb winding considering the interaction of the three limbs described above and applying superposition of the magnetomotive forces. Faraday's law of electromagnetic induction relates the respective number of turns and the rate of change of flux to the voltage developed across the winding. Thus, the effective output-to-input turns ratio is decreased by the balancing winding coupled in series with the primary winding. In one example, an output voltage may be calculated from an input voltage of 100V and primary, secondary, and balance winding turns of 12, 4, and 3, respectively as:

$$V_{out} = 100 \times \left[ \frac{4}{\left( 12 + \left( \frac{3}{2} \right) \right)} \right] = 29.6 \text{ V.} \qquad \text{(Eqn. 2)}$$

The decrease in the output-to-input turns ratio yields a lower output voltage than a flux-opposing arrangement as described below.

Figure 6:
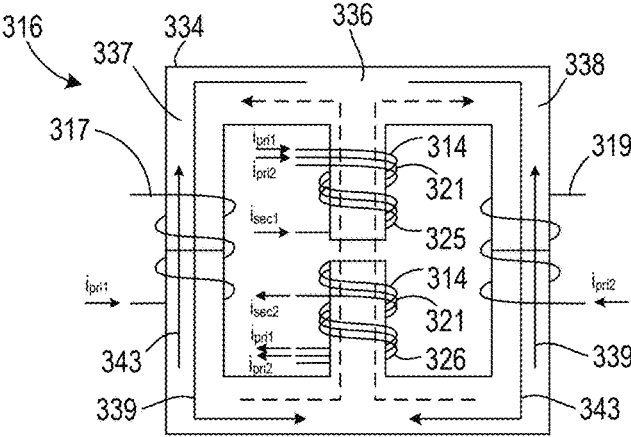
FIG. 6 illustrates a winding arrangement of the main transformer according to another embodiment.

FIG. 6 illustrates an example of an alternative winding protocol of the windings 314, 317, 319, 321, 325, 326 about the core 334. As shown, the primary windings 314, 321 are wrapped about both of the upper and lower portions of the central limb 336 while the first secondary winding 325 is wrapped about the upper portion of the central limb 336 and an upper portion of the primary windings 314, 321. The second secondary winding 326 is wrapped about the lower portion of the central limb 336 and a lower portion of the primary windings 314, 321.

Figure 7:
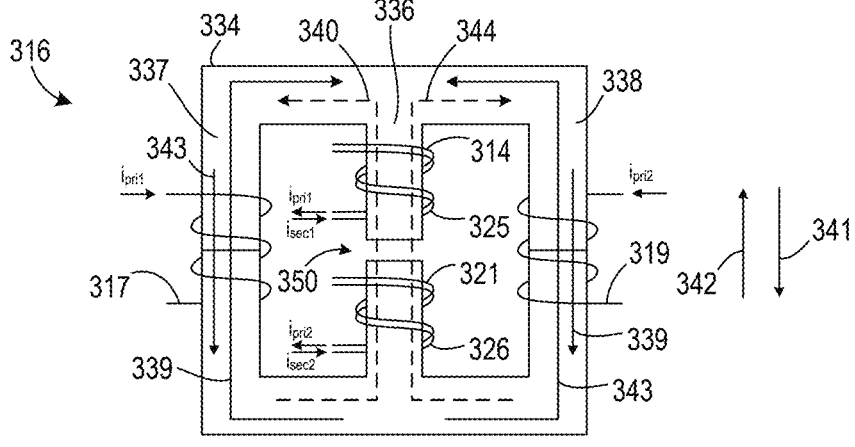
FIG. 7 illustrates a winding arrangement of the main transformer according to another embodiment.
Figure 8:
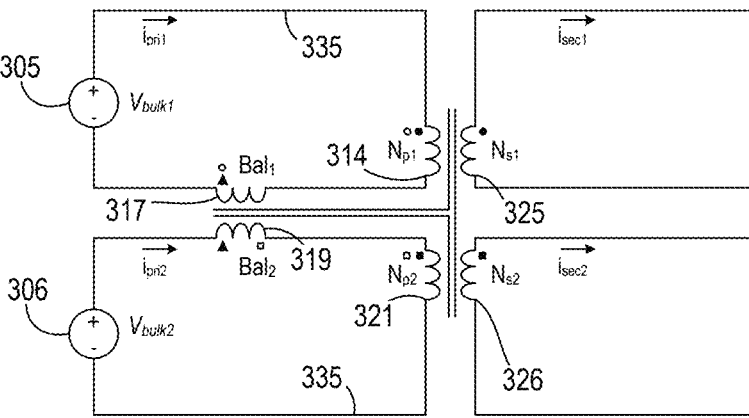
FIG. 8 illustrates a simplified current flow diagram of the multi-rail power converter of FIG. 3 based on the winding arrangement of FIG. 7 according to a embodiment.

FIGS. 7 and 8 respectively illustrate a winding protocol and a current flow diagram of the multi-rail power converter 300 of FIG. 3 according to another example. As shown, the winding relationships of the primary windings 314, 321 to the respective balance windings 317, 319 have changed to the opposite on balance winding terminal as compared with that shown in FIGS. 4, 5. Accordingly, the primary currents $i_{pri1}$, $i_{pri2}$ are introduced into the opposite terminals of the balance windings 317, 319, causing the flux 339 to flow in an upward direction 342 through the first outer limb 337 and in a clockwise direction about both outer limbs 337, 338 of the core 334 and the flux 343 to flow in the upward direction 342 through the second outer limb 338 and in a counter-clockwise direction about both outer limbs 337, 338 of the core 334. As such, the relationships of the primary winding 314 and the balance winding 317 and the relationship of the primary winding 321 and the balance winding 319 are flux-opposing. The respective flux-opposing relationships of the fluxes 339, 340 and the fluxes 343, 344 persist throughout the core 334. Together with the relationships of the fluxes 339, 340 and the fluxes 343, 344 being flux-opposing as described above, the relationship of the fluxes 339, 343 generated by the balance windings 317, 319 is also flux-opposing relationship along the outer limbs 337, 338.

While the directions of the magnetic fluxes 340, 344 generated by the first and second primary windings 314, 321 is the same in each of the embodiments illustrated in FIGS. 4 and 7, the directions of the magnetic flux 339 generated by the first balance winding 317 are opposite between the embodiments of FIGS. 4 and 7 and cause their flux-aiding or flux-opposing relationships described herein. Similarly, and the directions of the magnetic flux 343 generated by the second balance winding 319 are opposite between the embodiments of FIGS. 4 and 7 and cause their flux-aiding or flux-opposing relationships described herein. However, within each respective embodiment of FIG. 4 or FIG. 7, the directions of the fluxes 339, 343 generated by the balance windings 317, 319 is in a same direction in the respective outer limbs 337, 338, which causes their relationship to be flux-opposing in portions of the core 334 outside of the central limb 336 regardless of the embodiment of FIG. 4 or FIG. 7.

The output voltage of the flux-opposing arrangement illustrated in FIGS. 7 and 8 may be calculated based on the following equation:

$$V_{out} = V_{in} \times \left[ \frac{N_{sec}}{\left( N_{pri} - \left( \frac{N_{bal}}{2} \right) \right)} \right], \qquad \text{(Eqn. 3)}$$

where the difference between Eqn. 1 and Eqn. 3 includes a sign change in the denominator portion. Thus, the effective output-to-input turns ratio is increased by the balancing winding is coupled in series with the primary winding. In an example using the same values as the example above in the flux-aiding arrangement, the output voltage may be calculated as:

$$V_{out} = 100 \times \left[ \frac{4}{\left( 12 - \left( \frac{3}{2} \right) \right)} \right] = 38.1 \text{ V.} \qquad \text{(Eqn. 4)}$$

The increase in the output-to-input turns ratio yields a higher output voltage than a flux-aiding arrangement described above.

Figure 9:
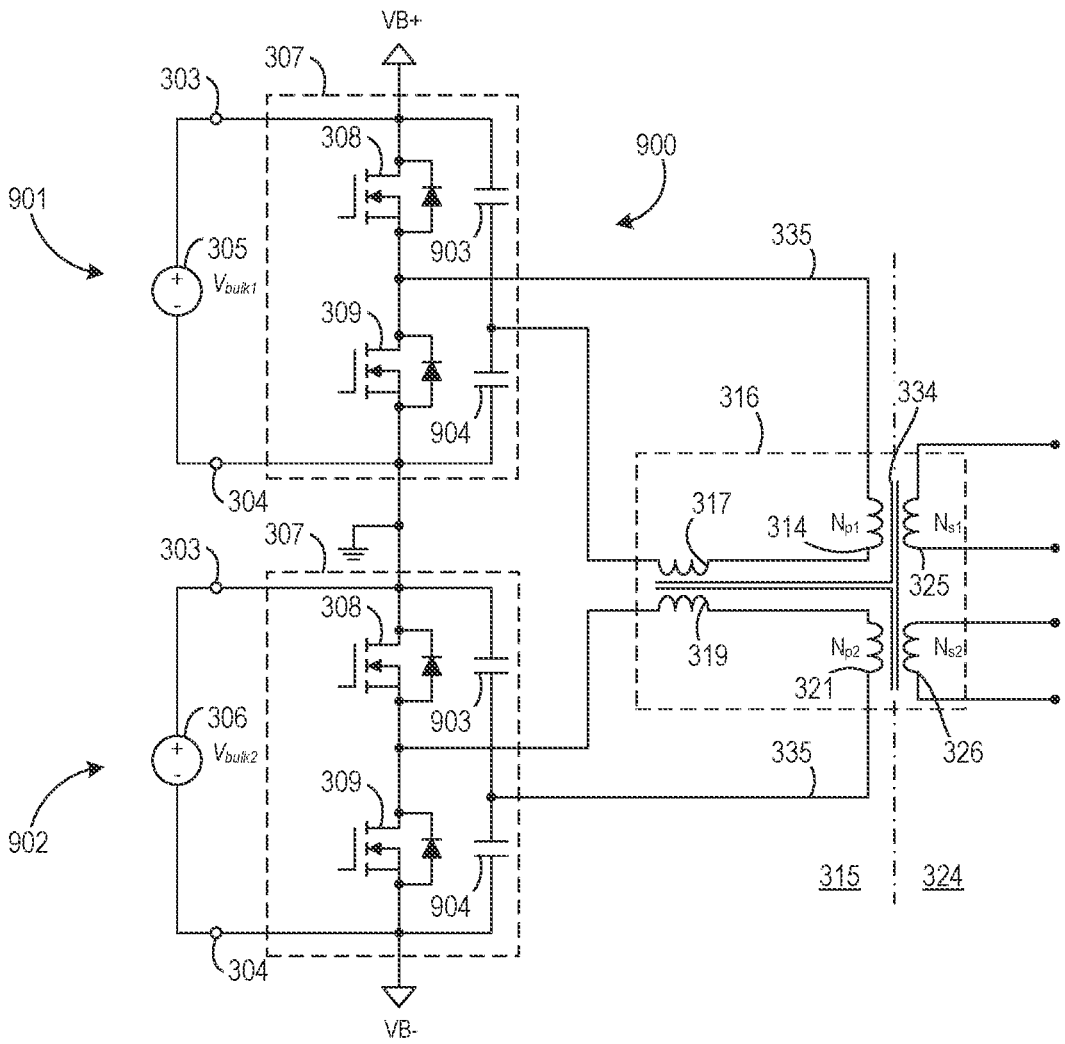
FIG. 9 illustrates a schematic diagram of a portion of the multi-rail power converter of FIG. 3 according to another embodiment.

FIG. 9 illustrates an example of an LLC multi-rail power converter 900 according to another embodiment. The power converters 901, 902 in FIG. 9 are illustrated as half-bridge LLC converter implementations of the power converters 301, 302 of FIG. 3. Substituting the power switches 310, 311 of the power converters 301, 302 are capacitors 903, 904. The windings of transformer 316 are shown coupled together and operate as described above.

FIG. 10 illustrates portion of a multi-rail power converter 1000 according to another embodiment. The primary side 315 portion of the power converter 1000 may be implemented as described above. In the embodiment illustrated, the secondary side 324 is implemented as a full-wave rectifier 1001.

FIG. 11 illustrates a voltage supply 1100 for providing different and distinct voltages for the voltage inputs of the multi-rail power converters described herein. For example, the voltage supply 1100 may provide the input voltages $V_{bulk1}$, $V_{bulk2}$ illustrated in FIGS. 3, 5, 8, and 9. The voltage supply 1100 is an AC/DC power converter configured to convert an AC input voltage from an AC voltage source 1101 (e.g., the power grid) into the multiple input voltages $V_{bulk1}$, $V_{bulk2}$. FIG. 12 illustrates multiple voltage source 1200, 1201 for providing different and distinct voltages for the voltage inputs of the multi-rail power converters described herein. The voltage source 1200 is coupled to a first voltage source 1202, and the voltage supply 1201 is coupled to a second voltage source 1203. The first and second voltage sources 1202, 1203 are distinct sources and may be AC or DC sources. Based on the disclosed embodiments herein, differences or imbalances in the primary currents of the multi-rail power converters due to disparate voltage provided by the voltage supplies 1100, 1200, 1201 may be significantly reduced and/or eliminated.

According to embodiments, adding reverse-coupled (e.g., flux cancelling) balancing windings in series with the main transformer primary windings forces current sharing among the rails in a single transformer package. Designing the primary and balance windings in a flux-aiding or flux-opposing arrangement provides freedom to tailor the output voltage and the magnetizing flux parameters.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the invention is not to be seen as limited by the foregoing description but is only limited by the scope of the appended claims.

The invention claimed is:

1. A voltage transformer comprising:
   a multi-limb transformer core comprising:
   a central limb;
   a first outer limb; and
   a second outer limb;
   a first primary winding wound about the central limb;
   a second primary winding wound about the central limb;
   a first secondary winding wound about the central limb;
   a second secondary winding wound about the central limb;
   a first balance winding wound about the first outer limb and coupled in series with the first primary winding; and
   a second balance winding wound about the second outer limb and coupled in series with the second primary winding;
   wherein the first and second balance windings are coupleable together via mutual inductance in response to first and second currents flowing therethrough;
   wherein the first outer limb is absent any other coil wound thereabout; and
   wherein the second outer limb is absent any other coil wound thereabout.

2. The voltage transformer of claim 1, wherein the multi-limb transformer core comprises:
   a first member comprising a central limb portion, a first outer limb portion, and a second outer limb portion; and
   a second member abutting the first member and comprising a central limb portion, a first outer limb portion, and a second outer limb portion.

3. The voltage transformer of claim 2, wherein the first secondary winding is wound about the central limb portion of the first member; and
   wherein the second secondary winding is wound about the central limb portion of the second member.

4. The voltage transformer of claim 3, wherein the first balance winding is wound about the first outer limb portion of the first member and the first outer limb portion of the second member; and
   wherein the second balance winding is wound about the second outer limb portion of the first member and the second outer limb portion of the second member.

5. The voltage transformer of claim 3, wherein the first primary winding is wound about the central limb portion of the first member; and
   wherein the second primary winding is wound about the central limb portion of the second member.

6. The voltage transformer of claim 5, wherein the first primary winding and the first secondary winding are wound about the central limb portion of the first member; and
   wherein the second primary winding and the second secondary winding are wound about the central limb portion of the second member.

7. The voltage transformer of claim 6, wherein an air gap separates the central limb portion of the first member from the central limb portion of the second member.

8. The voltage transformer of claim 7, wherein the first outer limb portion of the first member abuts the first outer limb portion of the second member without an air gap; and wherein the second outer limb portion of the first member abuts the second outer limb portion of the second member without an air gap.

9. The voltage transformer of claim 8, wherein the first balance winding is wound about the first outer limb portion of the first member and the first outer limb portion of the second member; and
   wherein the second balance winding is wound about the second outer limb portion of the first member and the second outer limb portion of the second member.

10. The voltage transformer of claim 2, wherein the first primary winding and the second primary winding are wound about the central limb portion of the first member and are wound about the central limb portion of the second member.

11. A power supply comprising:
   a transformer comprising:
   a core comprising a central limb and a pair of outer limbs;
   a pair of primary windings wound about the central limb;
   a pair of secondary windings wound about the central limb;
   a first balance winding wound about a first outer limb of the pair of outer limbs and coupled in series with a first primary winding of the pair of primary windings via a first current flow path; and
   a second balance winding wound about a second outer limb of the pair of outer limbs and coupled in series with a second primary winding of the pair of primary windings via a second current flow path;
   first and second voltage converters, each comprising:
   a voltage input configured to receive a distinct input voltage;
   a plurality of switches coupled between the voltage input and the transformer;
   wherein at least one switch of the plurality of switches of the first voltage converter is coupled with the first primary winding via the first current flow path; and
   wherein at least one switch of the plurality of switches of the second voltage converter is coupled with the second primary winding via a second current flow path;
   wherein the first balance winding is inductively coupled with the second balance winding via mutual inductance in response to first and second currents flowing through the first and second current flow paths;
   wherein the first outer limb is absent any other coil wound thereabout; and
   wherein the second outer limb is absent any other coil wound thereabout.

12. The power supply of claim 11, wherein:
   the first current flowing along the first current flow path during a positive voltage power delivery operation is configured to:
   generate a first magnetic flux in a first direction through the central limb; and
   generate a second magnetic flux in a second direction through the first outer limb;
   the second current flowing along the second current flow path during the positive voltage power delivery operation is configured to:
   generate a third magnetic flux in a third direction through the central limb; and
   generate a fourth magnetic flux in a fourth direction through the second outer limb.

13. The power supply of claim 12, wherein the first and third directions are in a same direction; and wherein the second and fourth directions are in a direction opposite to the direction of the first and third directions.

14. The power supply of claim 12, wherein the first, second, third, and fourth directions are in a same direction.

15. The power supply of claim 12, wherein the second magnetic flux is in a flux-opposing relationship with the fourth magnetic flux.

16. The power supply of claim 15, wherein the first magnetic flux is in a flux-aiding relationship with the second magnetic flux; and wherein the third magnetic flux is in a flux-aiding relationship with the fourth magnetic flux.

17. The power supply of claim 15 wherein the first magnetic flux is in a flux-opposing relationship with the second magnetic flux; and wherein the third magnetic flux is in a flux-opposing relationship with the fourth magnetic flux.

18. The power supply of claim 11, wherein the core comprises:

a first member comprising a central limb portion, a first outer limb portion, and a second outer limb portion; and a second member abutting the first member and comprising a central limb portion, a first outer limb portion, and a second outer limb portion; and wherein an air gap separates the central limb portion of the first member from the central limb portion of the second member.

19. The power supply of claim 18, wherein the first outer limb portion of the first member abuts the first outer limb portion of the second member without an air gap;

wherein the second outer limb portion of the first member abuts the second outer limb portion of the second member without an air gap;

wherein the first balance winding is wound about the first outer limb portion of the first member and the first outer limb portion of the second member; and wherein the second balance winding is wound about the second outer limb portion of the first member and the second outer limb portion of the second member.

20. The power supply of claim 11, wherein the switches of the plurality of switches are coupled together in a full-bridge arrangement.

* * * * *